(12) United States Patent
Enns et al.

(10) Patent No.: US 9,084,290 B2
(45) Date of Patent: *Jul. 14, 2015

(54) SYSTEM AND METHOD FOR WIRELESS PROCESS COMMUNICATION OVER DISTINCT NETWORKS

(71) Applicant: Fisher-Rosemount Systems, Inc., Round Rock, TX (US)

(72) Inventors: Frederick Enns, Menlo Park, CA (US); Martin Zielinski, Chanhassen, MN (US); Jose Gutierrez, St. Louis, MO (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/680,754

(22) Filed: Nov. 19, 2012

(65) Prior Publication Data

US 2013/0195010 A1 Aug. 1, 2013

Related U.S. Application Data

(62) Division of application No. 12/487,018, filed on Jun. 18, 2009, now Pat. No. 8,315,263.

(60) Provisional application No. 61/073,605, filed on Jun. 18, 2008.

(51) Int. Cl.
*H04W 92/02* (2009.01)
*H04L 12/40* (2006.01)
(Continued)

(52) U.S. Cl.
CPC ......... *H04W 92/02* (2013.01); *H04L 12/40006* (2013.01); *H04L 45/52* (2013.01);
(Continued)

(58) Field of Classification Search
None
See application file for complete search history.

(56) References Cited

U.S. PATENT DOCUMENTS

| 5,251,205 A | 10/1993 | Callon et al. |
| 5,442,632 A | 8/1995 | Burton et al. |

(Continued)

FOREIGN PATENT DOCUMENTS

| GB | 2394124 | 4/2004 |
| JP | 2008507217 | 6/2008 |

(Continued)

OTHER PUBLICATIONS

Office Action from corresponding U.S. Appl. No. 14/487,018, dated Apr. 16, 2012.

(Continued)

*Primary Examiner* — Eunsook Choi
(74) *Attorney, Agent, or Firm* — Westman, Champlin & Koehler, P.A.

(57) ABSTRACT

A dual-mode router for conveying process communication packets across a plurality of distinct wireless process communication networks is provided. The router includes wireless communication circuitry and a controller coupled to the wireless communication circuitry. The wireless communication circuitry is configured to interact with signals from each of the plurality of distinct wireless process communication networks. The controller is configured to adapt process communication packets from a first distinct wireless process communication network for transmission over a second distinct wireless process communication network. Methods for configuring the distinct wireless process communication networks and relaying process packets over the distinct wireless process communication networks are also provided.

19 Claims, 15 Drawing Sheets

(51) Int. Cl.
*H04L 12/781* (2013.01)
*H04W 40/00* (2009.01)
*H04L 29/08* (2006.01)
*H04L 29/06* (2006.01)
*H04W 88/16* (2009.01)

(52) U.S. Cl.
CPC ............... *H04L 67/12* (2013.01); *H04L 69/08* (2013.01); *H04W 40/00* (2013.01); *H04L 2012/4026* (2013.01); *H04W 88/16* (2013.01)

(56) References Cited

U.S. PATENT DOCUMENTS

| | | | |
|---|---|---|---|
| 5,442,639 A | 8/1995 | Crowder et al. | |
| 6,211,649 B1 | 4/2001 | Matsuda | |
| 6,377,859 B1 | 4/2002 | Brown et al. | |
| 6,629,059 B2 | 9/2003 | Borgeson et al. | |
| 7,117,122 B2 | 10/2006 | Zielinski et al. | |
| 7,349,427 B1 | 3/2008 | Canning et al. | |
| 7,421,531 B2 | 9/2008 | Rotvold et al. | |
| 8,315,263 B2 | 11/2012 | Enns et al. | |
| 2003/0236579 A1* | 12/2003 | Hauhia et al. | 700/79 |
| 2004/0111238 A1 | 6/2004 | Kantzes et al. | |
| 2004/0228184 A1 | 11/2004 | Mathiowetz | |
| 2004/0230327 A1 | 11/2004 | Opheim et al. | |
| 2005/0276233 A1* | 12/2005 | Shepard et al. | 370/254 |
| 2006/0291438 A1 | 12/2006 | Karschnia et al. | |
| 2007/0078540 A1* | 4/2007 | Bump et al. | 700/90 |
| 2008/0114911 A1 | 5/2008 | Schumacher | |
| 2008/0125039 A1 | 5/2008 | Glinka | |
| 2008/0253347 A1 | 10/2008 | Cordeiro et al. | |
| 2009/0046732 A1 | 2/2009 | Pratt, Jr. et al. | |
| 2009/0067389 A1 | 3/2009 | Lee et al. | |
| 2009/0102601 A1 | 4/2009 | Mathiesen et al. | |
| 2009/0257397 A1 | 10/2009 | Kwak et al. | |
| 2012/0076007 A1* | 3/2012 | Nelson | 370/252 |

FOREIGN PATENT DOCUMENTS

| | | |
|---|---|---|
| WO | 0228323 | 4/2002 |
| WO | WO 02/28123 | 4/2002 |
| WO | 2006020168 | 2/2006 |
| WO | 2007014021 | 2/2007 |
| WO | 2008027615 | 3/2008 |
| WO | 2009003146 | 12/2008 |
| WO | 2009003148 | 12/2008 |

OTHER PUBLICATIONS

Office Action from corresponding U.S. Appl. No. 14/487,018, dated Dec. 8, 2011.
Office Action from corresponding U.S. Appl. No. 12/487,018, dated Apr. 16, 2012.
Office Action from corresponding U.S. Appl. No. 12/487,018, dated Dec. 8, 2011.
Notification of Reasons for Rejection from related Japanese patent application No. 2011-514804 dated Feb. 21, 2012.
Maribel Rios, Unplugged: Developing Standards for Wireless Automation, May 2, 2008.
EPO Communication pursuant to Rules 161 and 162 from European patent application No. 09767720.7 dated Feb. 2, 2011.
Technical Data Sheet, VIATOR® USB HART® Interface Model (Model 010031). MACTek Measurement and Control Technologies, dated Jan. 24, 2004.
VIATOR® Bluetooth® Wireless Technology Interface for use with HART field devices. MACTek Measurement and Control Technologies retrieved from www.mactekcorp.com/product5.htm, dated 2009.
Product Data Sheet: VIATOR RS232. MACTek Measurement and Control Technologies retrieved from www.mactekcorp.com/product.htm, dated 2009.
International Search Report and Written Opinion for application No. PCT/US2009/047785 dated Dec. 14, 2009.

* cited by examiner

WirelessHART MAC Header

ISA100.11a MAC Header

Wireless HART DLL Header

ISA100.11a DLL Header

WirelessHART Network Header

ISA100.11a Unfragmanted
Network Header

ISA100.11a Fragmanted
Network Header

SYSTEM AND METHOD FOR WIRELESS PROCESS COMMUNICATION OVER DISTINCT NETWORKS

CROSS-REFERENCE TO RELATED APPLICATION

The present application is a divisional of and claims priority of U.S. patent application Ser. No. 12/487,018, filed Jun. 18, 2009, which application is based on and claims the benefit of U.S. provisional patent application Ser. No. 61/073,605, filed Jun. 18, 2008, the contents of which applications are hereby incorporated by reference in their entireties.

BACKGROUND

In industrial settings, control systems are used to monitor and control industrial and chemical processes, and the like. Typically, the control system performs these functions using field devices distributed at key locations in the industrial process and coupled to the control circuitry in the control room by a process control loop. Field devices generally perform a function, such as sensing a parameter or operating upon the process, in a distributed control or process monitoring system.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device. The process control loop also carries data, either in an analog or digital format.

Traditionally, analog field devices have been connected to the control room by two-wire process control current loops, with each device connected to the control room by a single two-wire control loop. In some installations, wireless technologies have begun to be used to communicate with field devices. Wireless operation simplifies field device wiring and set-up.

One wireless process communication technology standard is known as the WirelessHART® standard. The WirelessHART® standard was published by the HART® Communication Foundation in September 2007. Relevant portions of the WirelessHART® Specification include: HCF_Spec 13, revision 7.0; HART® Specification 65—Wireless Physical Layer Specification; HART® Specification 75—TDMA Data Link Layer Specification (TDMA refers to Time Division Multiple Access); HART® Specification 85—Network Management Specification; HART® Specification 155—Wireless Command Specification; and HART® Specification 290—Wireless Devices Specification.

Another wireless process communication standard is set forth in ISA100.11a (anticipated standard release is August 2009). This technology proposes wireless communication at the 2.4 GHz frequency using radio circuitry in accordance with IEEE 802.15.4-2006. The ISA100.11a standard is maintained by the International Society of Automation (ISA).

While these wireless network communication technologies use the same frequency band, radio circuitry and are configured to coexist in the presence of each other, as well as other wireless technologies at the 2.4 GHz frequency, coexistence is not interoperability. For example, the ISA100.11a standard indicates that coexistence is the ability of a wireless network to perform its task in an environment where there are other wireless networks that may not be based on the same standard. As used herein, two networks that are not based on the same standard will be considered "distinct" networks.

SUMMARY

A dual-mode router for conveying process communication packets across a plurality of distinct wireless process communication networks is provided. The router includes wireless communication circuitry and a controller coupled to the wireless communication circuitry. The wireless communication circuitry is configured to interact with signals from each of the plurality of distinct wireless process communication networks. The controller is configured to adapt process communication packets from a first distinct wireless process communication network for transmission over a second distinct wireless process communication network. Methods for configuring the distinct wireless process communication networks and relaying process packets over the distinct wireless process communication networks are also provided.

BRIEF DESCRIPTION OF THE DRAWINGS

FIG. 2 is a diagrammatic view illustrating WirelessHART® and ISA100.11a gateways connected to the ISA100.11a network through ISA100.11a.

DETAILED DESCRIPTION OF ILLUSTRATIVE EMBODIMENTS

Figure 1:
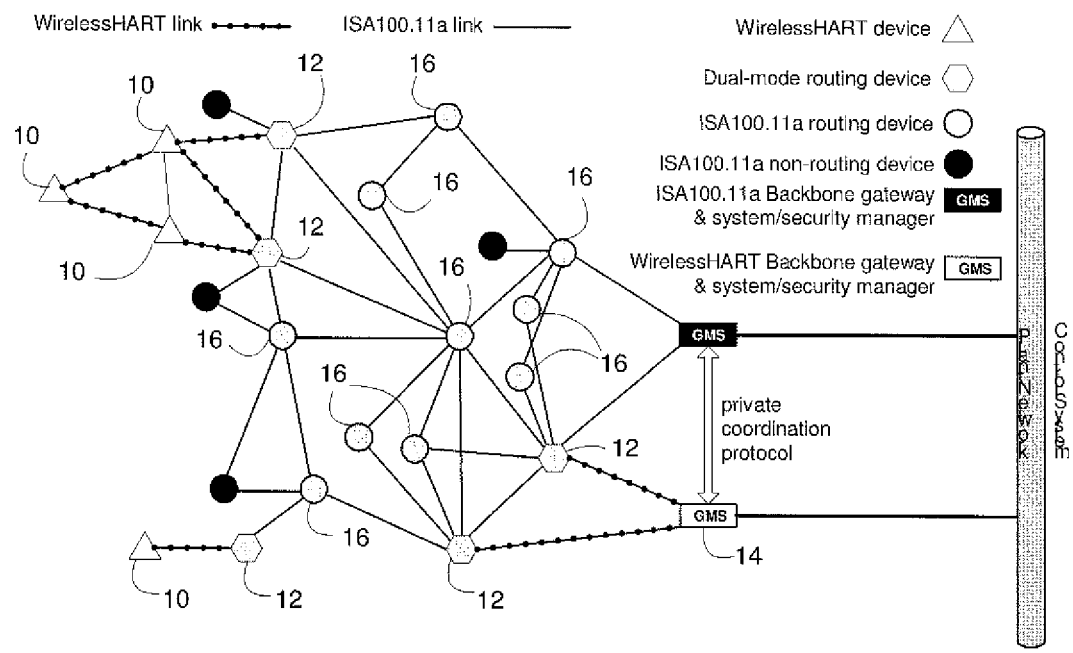
FIG. 1 is a diagrammatic view illustrating WirelessHART® devices communicating with a WirelessHART® gateway through an ISA100.11a network in accordance with an embodiment of the present invention.

ISA100.11a and WirelessHART® have both designed coexistence features into their specifications that allow other networks to operate in their presence. However, coexistence is not interoperability, and coexistence does not deliver the same efficiency and performance that a cooperative ISA100.11a and WirelessHART® network could provide. Embodiments of the present invention generally provide the ability to deploy both WirelessHART® and ISA100.11a devices using a common network infrastructure that makes efficient use of the radio-frequency spectrum and timeslots, avoids transmission collisions, and provides for a coordinated system management of the joint network. Embodiments set forth herein may allow a user to deploy both WirelessHART® and ISA100.11a devices in a unified network infrastructure, which takes the risk out selecting wireless devices and wireless standards.

In accordance with one embodiment (described in more detail later in the specification) a dual-mode router is disclosed that is capable of receiving and transmitting WirelessHART® and ISA100.11a packets. The dual-mode router has a relay function that transfers the payload of a packet from one network protocol to the other. The dual-mode router can take a WirelessHART® packet, strip off a portion of the WirelessHART® protocol header, and place the payload in an ISA100.11a packet that transverses the network as any ISA100.11a packet would. For the reverse operation, the dual-mode router recognizes a WirelessHART® relayed packet, strips off portions of the ISA100.11a header, and reforms the WirelessHART® packet that is then transmitted on the WirelessHART® network. The relay function works at the network and transport layers to be able to construct a packet that is routed transparently through ISA100.11a routers. The dual-mode router preferably appears to the ISA100.11a network as a routing type device. The operation of the dual-mode router and the relay function is also preferably transparent to WirelessHART® devices and applications.

Embodiments of the present invention generally leverage the similarities that already exist between WirelessHART® and ISA100.11a in the physical, MAC and DLL layers. Both standards selected the same radio and ISM band for operation because of the commercially available chips and the worldwide accessibility to unlicensed spectrum. They also selected the same MAC layer from the IEEE802.15.4 standard, which they use in the same way. While the two standards have different headers for the DLL, they have similar basic capabilities. They both support time-slotted superframe-based, mesh network access to the wireless network. They also share the same channel hopping technique, graph and source routing concepts, and DLL security approach. By selecting WirelessHART® compatible values for existing ISA100.11a parameters, the two standards can coordinate their use of the wireless network and unify the wireless infrastructure.

DEFINITIONS

The two standards' documents share many concepts and the terms used to name them. These shared terms include: superframe, timeslot, link, graph, source route, and gateway. The language used in this document comes from ISA100 and, unless specifically addressed here, also applies the WirelessHART®.

Access point The WirelessHART® term for a device that connects the wireless network to the WirelessHART® gateway through a backbone network. The access point is optional. Without it the WirelessHART® gateway is directly connected to the wireless network. The WirelessHART® access point is similar in function to the ISA100.11a backbone router.

ASN Absolute Slot Number—A WirelessHART® parameter that counts the number of timeslots since the formation of the network. It is stored as a 5 octet field in every device.

Dual-mode device The device in accordance with an embodiment of the present invention that transfers messages in the form of packets between the WirelessHART® network and the ISA100.11a network. In one described embodiment it preferably appears as a routing type device to the ISA100.11a system.

Network manager The WirelessHART® term for the management function that configures and monitors the network. In ISA100.11a and this document, the management function is called the "system manager".

PAN Identifier The IEEE802.15.4 standard uses the term PAN (Personal Area Network) identifier as the numeric identity of a wireless network. WirelessHART® and ISA100.11a often substitute the term network ID.

Relay function The role of a dual-mode device in accordance with an embodiment of the present invention that translates the protocol stacks between the WirelessHART® and ISA100.11a networks. The relay function is preferably implemented in the dual-mode router, and it may also be implemented in a WirelessHART® gateway, if the WirelessHART® gateway includes a portion of ISA100.11a network stack.

Network Configurations

FIG. 1 shows WirelessHART® devices 10 communicating with the WirelessHART® gateway 14 through an ISA100.11a network in accordance with an embodiment of the present invention. The WirelessHART® devices 10 may form WirelessHART® network regions that connect to dual-mode routers 12, or they may connect directly to dual-mode routers 12. In FIG. 1, the WirelessHART® gateway 14 does not support an ISA100.11a protocol stack, so it connects through dual-mode routers 12 as WirelessHART® field devices 10 do. The system management function for both networks may be combined or separate. In FIG. 1 they are shown as separate functions with a communication protocol that coordinates the management of the combined network. The user's network administrator decides when to use a regular ISA100.11a routing device or a dual-mode router in accordance with an embodiment of the present invention. All the IS100.11a routing devices 16 may be configured, or otherwise adapted, to provide functions of dual-mode routers 12, in which case WirelessHART® devices 10 are able to connect anywhere in the ISA100.11a network.

As illustrated in FIG. 1, embodiments of the present invention provide the ISA100.11a network with the ability to transport WirelessHART® packets across the network. This is generally enabled by the function of the dual-mode router(s) 12, in accordance with an embodiment of the present invention, that connects to both networks and transfers packets between them. The dual-mode router preferably implements a relay function that performs the transfer by translating lower layer packet headers and encapsulating higher layer headers and the packet's payload. The dual-mode router and its relay function enable WirelessHART® devices 10 to operate on all the ISA100.11a network topologies.

Figure 2:
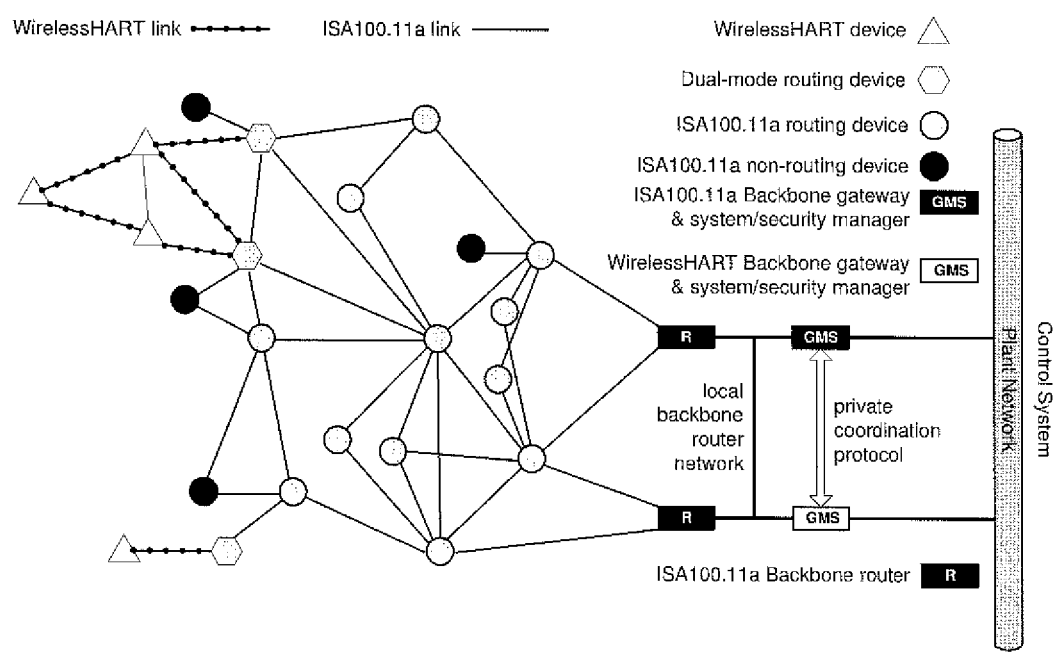

FIG. 2 illustrates WirelessHART® 14 and ISA100.11a 18 gateways connected to the ISA100.11a network through ISA100.11a. The gateways 14, 18 can use either backbone router since they are all connected on a local network. ISA100.11a relay packets with WirelessHART® payloads communicate over the local backbone router network in the same way as regular ISA100.11a packets do because both use the ISA100.11a network layer.

Compatibility Issues for Distinct Wireless Networks

Various compatibility issues between ISA100.11a and WirelessHART® are discussed below. These issues relate generally to the Radio; MAC operation; DLL operation; Network Layer Operation; Relay Layer Operation; System Management; Security; and Gateway functions. The issues are addressed in turn as follows.

Radio

Both WirelessHART® and ISA100.11a use the same radio specified in the IEEE802.15.4 standard's section for operating in the 2.4 GHz band. Therefore, compatibility involves selecting an ISA100.11a profile with radio parameters that work with WirelessHART®.

Both standards extend the radio's requirements to specify additional parameters such as the time required to change frequency. These extended parameters have to be adjusted to make operation of both types of devices compatible.

The operational transmit power levels are configurable in both standards. Some of the radio parameters that must be configured for compatibility between ISA100.11a with WirelessHART® include, but are not limited to: transmit power, maximum radio turn-on time, time to switch between channels, number of channels, the IEEE802.15.4 channel numbers, and clear channel assess mode.

MAC Operation

Figure 3:
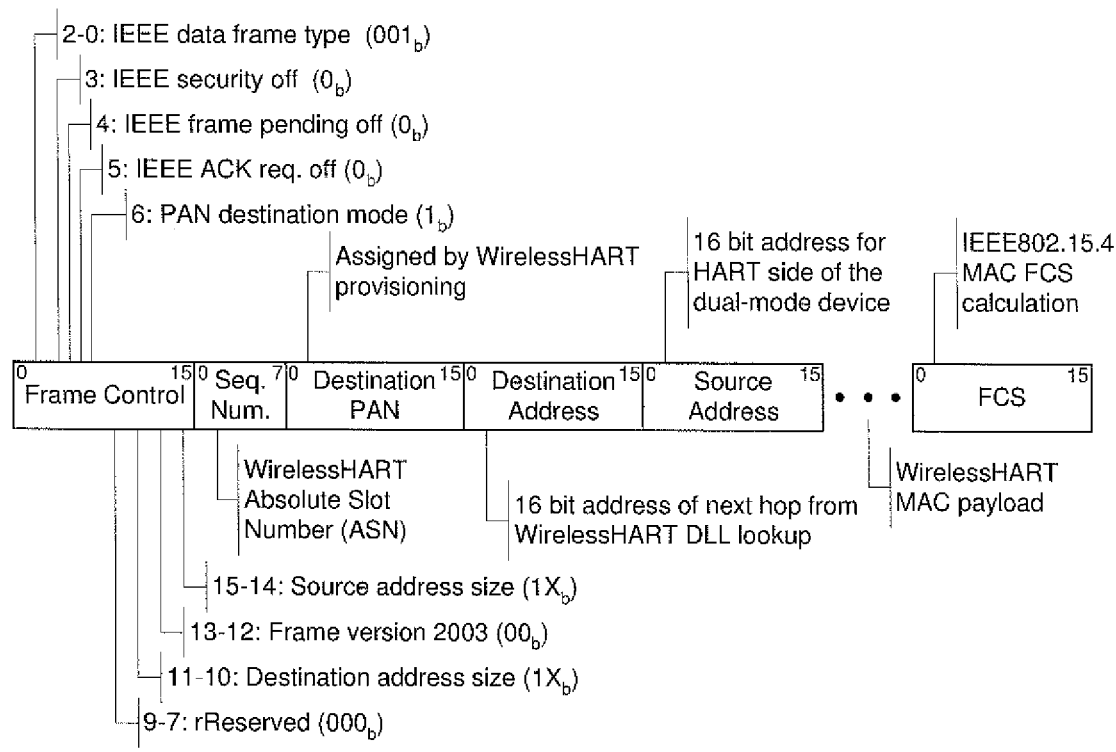
FIG. 3 is a diagrammatic view of a WirelessHART® MAC header.
Figure 4:
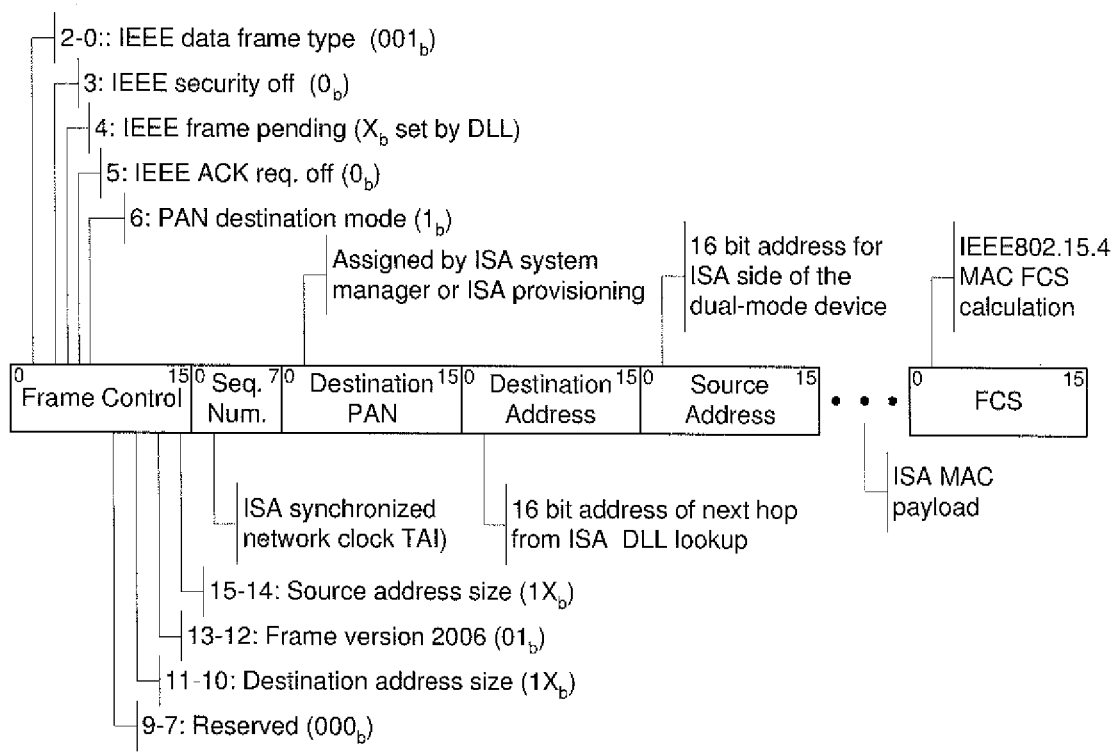
FIG. 4 is a diagrammatic view of an ISA100.11a MAC header.

Both standards specify the use of the IEEE802.15.4 MAC header and do so using the same structural options as seen in FIGS. 3 and 4. Therefore, both WirelessHART® and ISA100.11a are able to parse the fields of each other's MAC layer. There are only two differences in the MAC layer of the standards. WirelessHART® uses the value for the IEEE802.15.4-2003 in the MAC version field, and ISA100.11a uses the value for the IEEE802.15.4-2006. Both values work since the MAC format chosen by each standard is compatible with either IEEE version. The other difference in the MAC is the value used for the sequence number field. WirelessHART® uses the least significant octet of the Absolute Slot Number (ASN) that increments every 10 ms, and ISA100.11a uses the 1 ms resolution TAI clock. A dual-mode router can easily switch between the two usages. The IEEE802.15.4 MAC comparison is summarized in the following table. ISA stands for ISA100.11a, while WH stands for WirelessHART®.

| Field | Size (Octet) | Bit | WH usage | ISA | Notes |
|---|---|---|---|---|---|
| 1 | 1 | | Frame Control | Frame Control #1 | Frame (both standards fix this octet value to be 0x41) |
| | | 7 | Not used (0) | Reserved (0) | Reserved by 802.15.4 |
| | | 6 | One PAN ID (1) Destination PAN ID selected | One PAN ID (1) Destination PAN ID selected | PAN ID Selector Destination PAN ID used if source and destination addresses selected |
| | | 5 | No MAC ACK (0) Uses a DLL ACK | No MAC ACK (0) Uses DLL ACK | Flag or requesting an 802.15.4 ACK (not used by either standard) |
| | | 4 | No frame pending (0) | No frame pending (0) | Frame Pending flag, (not used by either standard) |
| | | 3 | No MAC security (0) | No MAC security (0) | 802.15.4 Flag (Each standard uses its own DLL security so 15.4 MAC security is turned off. |
| | | 0-2 | Data type (001) | Data type (001) | Both standards use only the 802.15.4 data type |
| 2 | 1 | | Address Specifier | Frame Control #2 | |
| | | 7 | Source address (1) | Source address (1) | Both standards use the source address, 1 = present |
| | | 6 | Source address size: 2 or 8 octets | Source address size: 2 or 8 octets | Size flag: 0 = 2 octets, 1 = 8 octets |
| | | 4-5 | Set to 0x00 | Set to 0x01 | Frame version 802.15.4 set this to 0x00 = 2003 0x01 = 2006 |
| | | 3 | Destination address (1) | Destination address (1) | Both standards use the destination address, 1 = present |
| | | 2 | Destination address size: 2 or 8 octets | Destination address size: 2 or 8 octets | Size flag: 0 = 2 octets, 1 = 8 octets |
| | | 0-1 | Set to 0x00 | Set to 0x00 | Reserved by 802.15.4 (0x00) |
| 3 | 1 | | 8 LSB of the Absolute Slot Number (ASN) | 8 LSB of a 1 ms TAI time | 802.15.4 Sequence number |
| 4 | 2 | | Destination PAN ID | Destination PAN ID | 802.15.4 Destination PAN ID (as determined by the PAN ID and use of source and destination addresses) |
| 5 | 2, 8 | | The WH 8 octet address uses the HART group ID: 0x001B1E HART assign device IDs from this space. | At this time ISA is not administering a address space within the IEEE addresses. | Destination Address Both standards use a locally assigned 2 octet address within a PAN ID or an 8 octet globally unique ID from IEEE. The unique ID is used for messages sent by the device during the join process before a 2 octet address is allocated. |
| 6 | 2, 8 | | Source address | Source address | Source Address Both standards use either an 8 octet unique address or a 2 octet local address with the 8 |

-continued

| Field | Size (Octet) | Bit | WH usage | ISA | Notes |
|---|---|---|---|---|---|
| 7 | 1 | | DPLDU | Dispatch | octet option only used for join process messages sent to the device Starting at the 7$^{th}$ field which corresponds to either the 10$^{th}$ octet or 16$^{th}$ octet of the MAC header, the two standards diverge in regards to the header fields. |

When relaying a packet, the dual-mode router receives a packet with one type of MAC header and transmits it with the other type of MAC header. The translation function it performs for a relayed packet is very similar to what it does when it routes a packet within an ISA100.11a or WirelessHART® network. In both cases the dual-mode router updates the sequence number field, inserts its source address, inserts the destination address it is given, and computes the Frame Check Sequence (FCS). The WirelessHART® and ISA100.11a MACs perform the same IEEE802.15.4 frame check calculation and place the result in the FCS field at the end of the packet.

For WirelessHART®, the first octet of the frame control field in FIG. 3 is fixed to be 0x41$_h$. This selects the IEEE MAC frame type to be a data packet and sets control flags to off for the IEEE802.15.4 security, frame pending and ACK. The second octet of the frame control field identifies the format of the address fields and the version of the IEEE802.15.4 specification used. For relayed packets, the source address format is always short, and the destination address is either long or short depending on if the packet is proxied, as is the case during the joining process. The dual-mode router uses the address field size appropriate for the destination address it is given. The protocol version type is set to identify the 2003 version of the standard.

The packets relayed to the WirelessHART® network use the ASN for the MAC sequence number. The ASN is configured in the dual-mode router when it joins the WirelessHART® network. The packets relayed to the ISA100.11a network use the TAI clock maintained by all ISA100.11a wireless devices.

The MAC format selected by both standards has the destination PAN identifier in the packet header. In WirelessHART®, the PAN identifier is provisioned prior to installation and can be reconfigured by the system manager during operation. In ISA100.11a, it may be either provisioned before installation or configured after joining the network.

The PAN ID can be setup to either span the WirelessHART® and ISA100.11a networks or be separate. Even in the WirelessHART® portion of the network, separate PAN IDs can be provisioned if the administrator wants to control which dual-mode router among a plurality of such routers a WirelessHART® device connects to.

In SPEC-075, Section 8.1.2, Table 2, WirelessHART® reserves PAN identifier ranges for various applications, like permanent user networks, temporary user networks, and manufacturer user networks. An ISA100.11a configuration should not make any assignments that conflict with WirelessHART®.

Both WirelessHART® and ISA100.11a use short 16 bit addresses for MAC source and destinations. They also use the same 64 bit IEEE-administered globally unique addresses for packets sent during the joining process. The HART® protocol requires that WirelessHART® devices be assigned 64 bit addresses from a block, 0x001B1E, assigned to the HART® Foundation.

The dual-mode router preferably has two short and two long MAC addresses assigned to it. One set is used when it transmits on the WirelessHART® network and one when it transmits on the ISA100.11a network as discussed as discussed in greater detail later in the specification.

DLL Operation

WirelessHART® has one octet for the DLL header that identifies the type of DLL message the packet contains, the DLL layer encryption key used, and DLL packet priority for the packet. The DLL also calculates a four-octet message integrity check (MIC) that goes at the end of the DLL payload.

ISA100.11a has defined DLL security parameters that are a superset of those used by WirelessHART®. While it is not required that ISA100.11a use exactly the same set, it is desirable because it simplifies the dual-mode router. An ISA100.11a DLL security profile that matches WirelessHART® is defined for this reason. Since the two standards have not coordinated the encoding of the DLL headers, there is no explicit identification in the header for what type of packet has been received. To keep ISA100.11a and WirelessHART® devices from inadvertently decoding each other's packets, the message integrity check keys employed by each standard should be different. This includes the well-known keys defined in the standards and the DLL keys configured by the security manager. The well-known key used by WirelessHART® is: 7777 772E 6861 7274 636F 6D6D 2E6F 7267h.

The ISA100.11a has DLL priority functions and codes. Protocol translators often do mapping between different priority schemes, but it is usually imperfect when different priorities are defined. WirelessHART® priority levels may be either mapped into ISA100.11a priority levels or for simplicity mapped into one level.

The ISA100.11a shares a number of similar packet types with WirelessHART®. These types include ACK, Advertise, and Data packet types. The local DLL packet types are not relayed in the network and they do not need to be relayed.

Both WirelessHART®'s and ISA100.11a's DLLs use timeslots, channel hopping offsets, channel hopping sequences, and superframes to partition network resources. WirelessHART® fixes the timeslot size to be 10 ms and specifies a precise timeslot timing template for when various operations within the timeslot are to occur. ISA100.11a has setup a flexible configuration for timeslots. This flexibility allows a timeslot template to be constructed that is compatible with WirelessHART®'s 10 ms slot. The dual-mode router requires that ISA100.11a have a timeslot template profile that matches that of WirelessHART®. The default timeslot template defined for ISA100.11a will work with the dual-mode router functionality.

Both WirelessHART® and ISA100.11a propagate time from a timing parent to a child. The system manager sets the parent-child relationships. In WirelessHART®, there are two ways timing is adjusted. In the first method, the child measures the slot-timing offset of packets from its parent and adjusts its clocks. In the second method, the parent receives a packet from the child and tells it what adjustment to make in the acknowledgement. Time will be able to flow through from the ISA100.11a network to the WirelessHART® network.

There are a number of parameters in the ISA100.11a system configuration that have to be coordinated with the WirelessHART® system so that the two networks can efficiently share the radio resources. These parameters include: channel hop sequences, superframe size assignments, and channel back-off settings.

In WirelessHART® and ISA100.11a, neighbor discovery is a DLL process that listens for other devices that are one hop away. Devices for each standard only discover like neighbors. The dual-mode router participates in neighbor discovery process of both standards and such participation is described later.

One potential advantage of embodiments of the present invention is an increase in the efficiency of collocated WirelessHART® and ISA100.11a networks. One way of accomplishing this is to eliminate interference in the form of avoidable transmission collisions between the devices in each network. Interference is reduced, in accordance with embodiments of the present invention, when both networks share common superframes and cooperatively allocate timeslots to devices.

To accomplish this, the two networks have to define a common superframe and synchronize the period and phase. Synchronizing the WirelessHART® ASN clock to the ISA100.11a TAI clock does this. In both standards, the superframe starting time slot is set by the respective standard's network time. In the case of ISA100.11a, this is the 1 ms TAI clock, and in the case of WirelessHART®, it is the 10 ms ASN clock. The coordinated system manager function maintains the conversion factor used to translate between the two clock representations. When the WirelessHART® system manager configures a superframe using command 965 in SPEC-155, it sets an execution time that corresponds to the ASN for the start of the superframe. ISA100.11a configures the start time with the TAI-cutover parameter.

Superframe lengths and timeslot assignments within the superframe are coordinated by the system management function.

Enabling the two networks to share timeslots within superframes increases the efficiency of operation of a WirelessHART® network and an ISA100.11a network. Shared timeslots are subject to collisions and when a collision occurs, access is resolved through a back-off algorithm. The back-off algorithm enforces access fairness amongst the contending devices. The same back-off algorithm parameter settings have to be configured in both networks for this fairness to be maintained between WirelessHART® and ISA100.11a devices.

The relay function of the dual-mode router constructs enough information from the incoming WirelessHART® packet for the ISA100.11a DLL layer to form the appropriate DLL and MAC header for the relayed packet. In the reverse direction, the relay function converts an ISA100.11a DLL and MAC header to the appropriate WirelessHART® DLL and MAC header.

Figure 5:
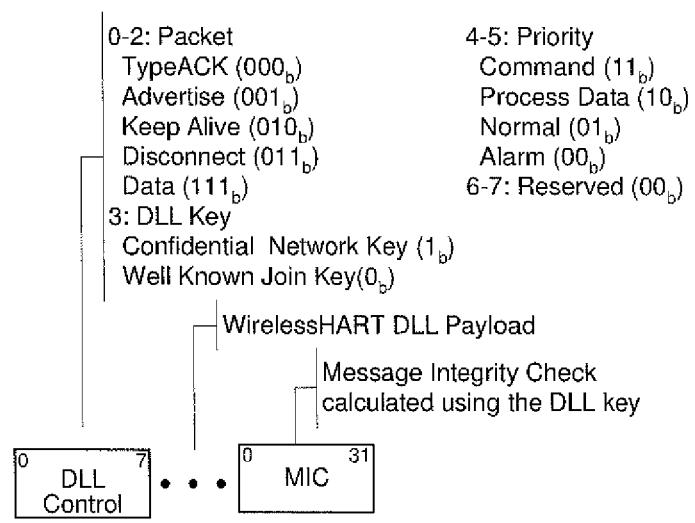
FIG. 5 is a diagrammatic view of a WirelessHART® DLL header.

The WirelessHART® DLL header fields are shown in FIG. 5. For relay packets the packet type is "data". The dual-mode router selects the DLL Key well-known key when it is proxying packets for a joining device. All other relayed packets use the confidential network key. Priority is set from information carried in the relay header described later in the specification.

Figure 6:
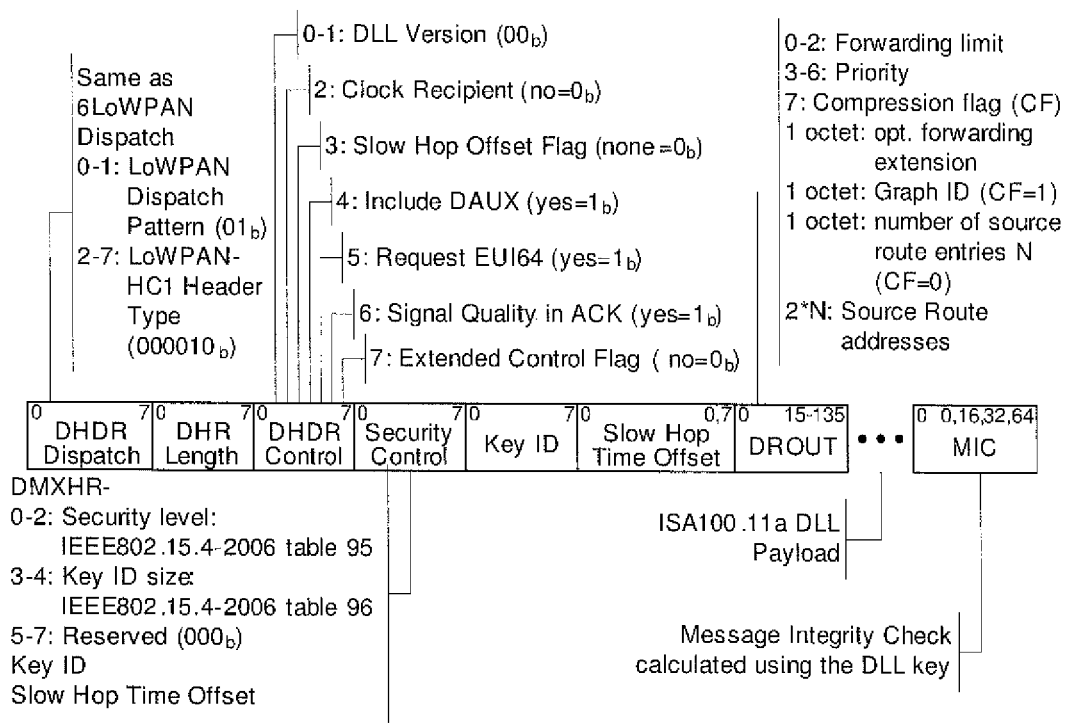
FIG. 6 is a diagrammatic view of an ISA100.11a DLL header.

The ISA100.11a DLL header used for relay packets is shown in FIG. 6. The DHDR dispatch octet identifies the DLL header as being compatible with the IETF 6LoWPAN network header. Bits 0 to 7 are set to 01000010$_b$. The DHR length field is calculated and set to the number of octets remaining in the DHDR header (excluding the MIC). The extended control field is included as needed according to the general ISA100.11a profile for the ISA side of the dual-mode router. The security code and key ID for the relay packets uses the security level selected for ISA100.11a data packets from the general ISA100.11a profile. The resources used by the ISA side of the dual-mode router determine the use of the slow hop time offset. The ISA100.11a priority field inside the DROUT header is translated by a set of rules. These rules can either map WirelessHART® priorities to ISA100.11a priorities or they can map all WirelessHART® messages to one ISA100.11a priority level.

The ISA100.11a DLL differs in concept from the WirelessHART® DLL by placing the routing information in this layer instead of the network layer. This is a difference in how the standards are described, not in how WirelessHART® routing functions operate. When the WirelessHART® network layer uses a graph route, the graph route ID is placed in the relayed packet's DROUT field. When the WirelessHART® network layer uses a source route, the source route is placed in the source route field of the DROUT header. WirelessHART® and ISA100.11a devices are configured by the coordinated system management function to use the same graph ID assignments and device address assignments. This simplifies the operation of the dual-mode router by not having it translate graph IDs and source routes.

Network Layer Operation

The WirelessHART® and ISA100.11a network layers are substantially different except for the most basic fields that contain the origin address, final destination address, and graph route identifier. Both WirelessHART® and ISA100.11a use the same 16 bit addresses for the network layer that are used by the MAC source and destination devices. The system management functions for each protocol coordinates the assignment of the 16 bit addresses to keep the relay function simple.

The dual-mode router processes incoming packets in a normal fashion until it determines that a packet has to be relayed. For WirelessHART® packets, the dual-mode router looks at the source route or graph ID, and, if the next hop goes to the ISA100.11a network, it passes the packet on to the relay function. For ISA100.11a packets, the dual-mode router looks to see if the packet's source route or graph ID sends it to the WirelessHART® network and that the packet is a relay packet, in which case it passes it to the relay function.

The received WirelessHART® packet's relay function constructs an ISA100.11a network layer header and then a relay header. If the WirelessHART® payload is too large to fit in one relayed packet, the payload is fragmented, by using the 6LoWPAN algorithm. For received ISA100.11a relay packets, the relay function constructs a WirelessHART® network layer header. In one embodiment, if the relay packet's payload is fragmented, the dual-mode router reconstructs the packet, by using the 6LoWPAN fragmentation header.

Figure 7:
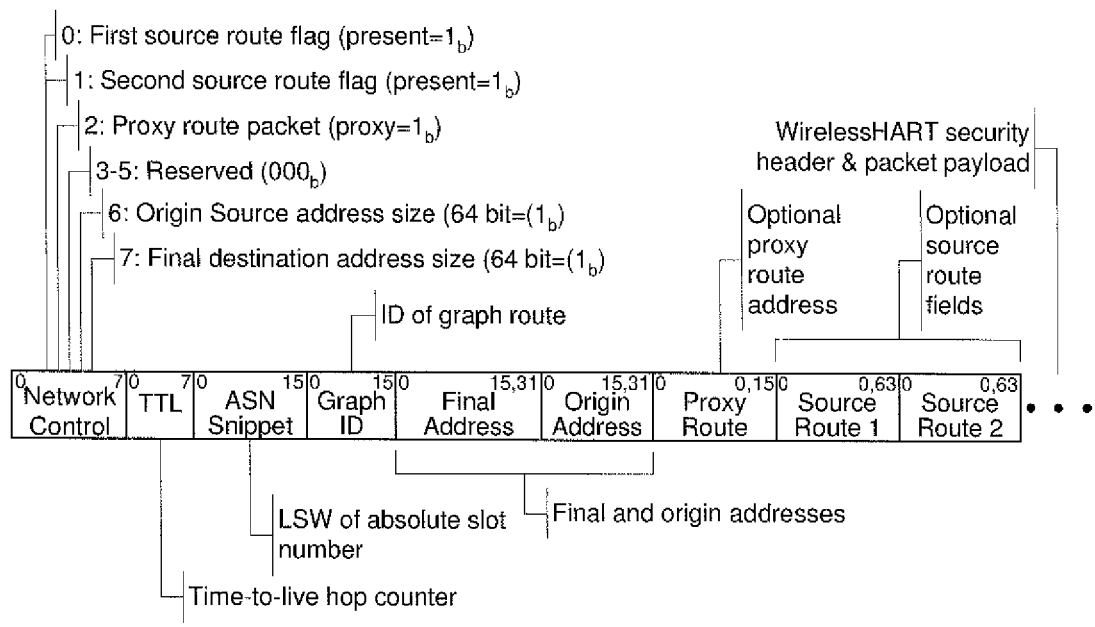
FIG. 7 is a diagrammatic view of a WirelessHART® network header.

FIG. 7 shows the WirelessHART® network header used for relayed packets. The network control octet fields are filled out in accordance with the information in the relayed packet. If a source route was used, then the first and, if needed, the second source route flags are set. The proxy flag is set if the dual-mode WirelessHART® management application is proxying the packet for the destination WirelessHART® device. The final network address size flag is set as part of its proxy function. For relayed packets, the origin network address size flag is always set to indicate a 16 bit address.

The time-to-live field (TTL) is based on the TTL field from the ISA100.11a header and decremented before transmission.

The ASN snippet identifies the time when the WirelessHART® packet was created. When the dual-mode router receives the packet from the ISA100.11a network, this value is derived from the information in the relay header. The dual-mode router determines if the packet is too old to be relayed by looking at the calculated ASN snippet and the maxPacketAge parameter The graph ID, final address, and origin address are copied from the ISA100.11a packet, as is the source route information if present. The proxy route address is derived from the relay header.

Figure 8:
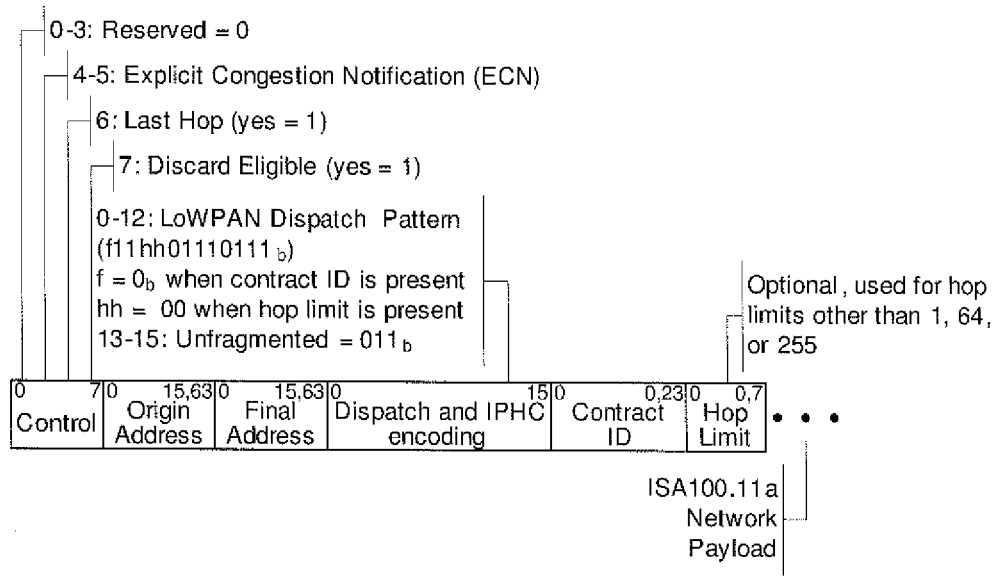
FIG. 8 is a diagrammatic view of an ISA100.11a unfragmented network header.

FIG. 8 shows an ISA100.11a network header used to transmit relay packets that do not require fragmentation in accordance with an embodiment of the present invention. The origin address size address and final address are taken from the addresses in the WirelessHART® packet. The hop limit is taken from the WirelessHART® TTL field and decremented before transmission. The WirelessHART® TTL field is one octet. The Contract ID is optional and not used by the relay packets.

If the WirelessHART® payload and relay headers are too large to fit in one ISA100.11a relayed packet, it is fragmented, and two relay packets are sent. The fragmentation header is used for these packets.

Figure 9:
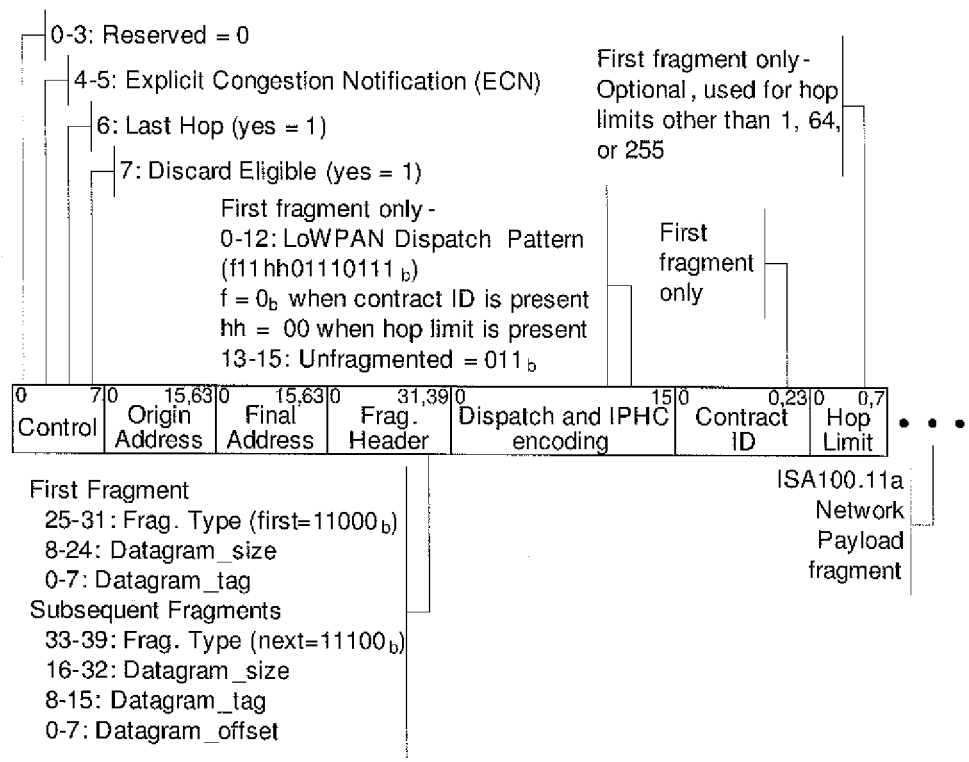
FIG. 9 is a diagrammatic view of an ISA100.11a fragmented network header.

FIG. 9 shows an ISA100.11a network header used for fragmentation of relay packets in accordance with an embodiment of the present invention. The fragmentation header identifies the first fragment and subsequent fragments, the size of the message being fragmented, an identifying tag for the message and a fragment position within the message. The rest of the header for the first packet is the regular network layer dispatch header and optional fields like those shown in FIG. 8.

The relay packets preferably use the 6LoWPAN dispatch field. It identifies by default the payload as UDP. For the relay packets, 6LoWPAN indicates that the UDP source and destination ports are compressed to four bits each, and that the UDP length and check sum is elided.

The hop limit is the uncompressed IPV6 hop limit field. It has no equivalent in the WirelessHART® protocol. It is set by the relay function to a configurable value selected to suit the needs of the network.

The UDP ports field is set to the four bit source and destination ports used by the relay function.

Relay Layer Operation

Figure 10:
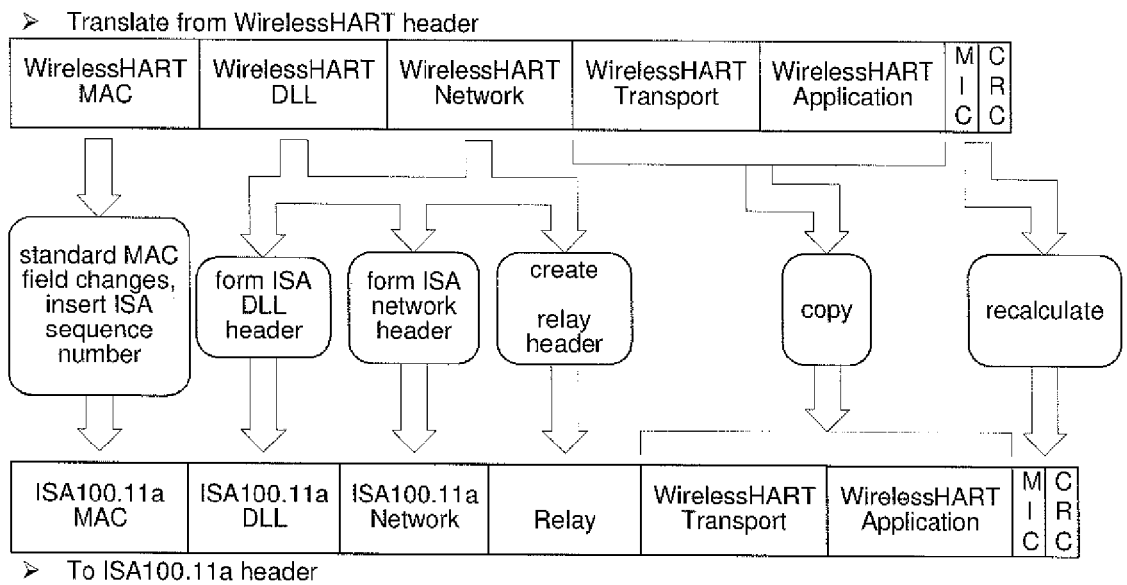
FIG. 10 is a diagrammatic view illustrating how the relay function constructs an ISA100.11a MAC, DLL, and Network layer header using the information contained in the WirelessHART® header in accordance with an embodiment of the present invention.

The relay function in a dual-mode router enables WirelessHART® packets to be transported over an ISA100.11a network. For WirelessHART® packets received by the dual-mode router, the relay function strips off those portions of the WirelessHART® MAC/DLL and Network layer headers that do not need to be sent to the final destination device. This includes information that can be recreated from ISA100.11a header information at the final device. FIG. 10 shows how the relay function constructs an ISA100.11a MAC, DLL, and Network layer header using the information contained in the WirelessHART® header. The relay function then adds a WirelessHART® relay header that communicates the WirelessHART® networking data needed by the far end and sends the packet. The payload of this packet contains the unaltered WirelessHART® transport layer and application layer data.

Figure 11:
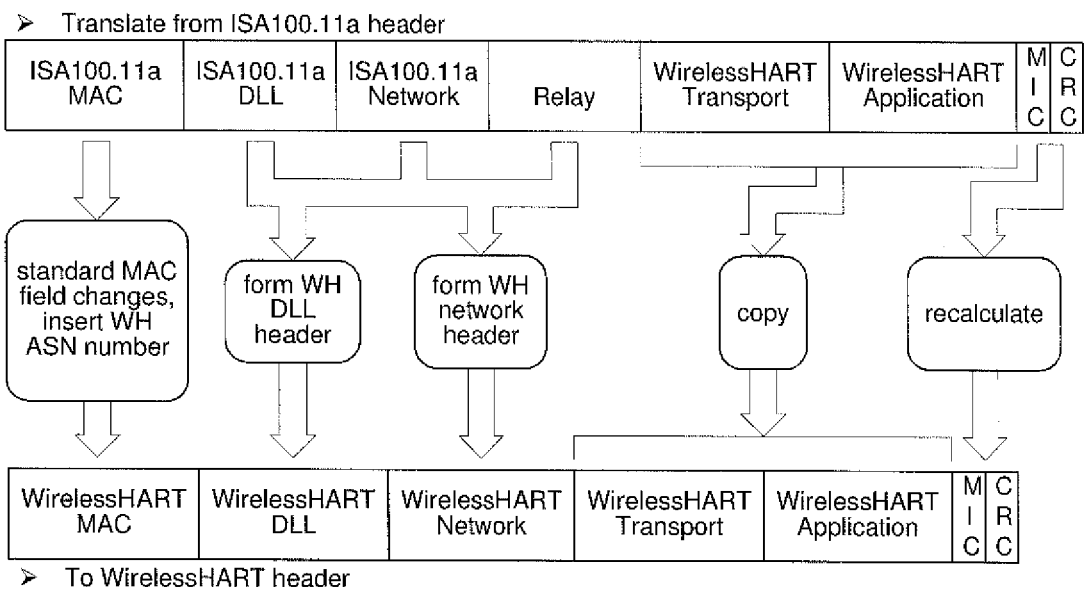
FIG. 11 is a diagrammatic view illustrating reception of a relay packet by a dual-mode router in accordance with an embodiment of the present invention.

When a dual-mode router, in accordance with an embodiment of the present invention, receives a relay packet, and the dual-mode router has to send the packet to the WirelessHART® network, the WirelessHART® MAC/DLL and Network layer header is reconstructed from the incoming ISA100.11a information and the relay header. This is shown in FIG. 11. The relay function is above the network layer. This allows the constructed ISA100.11a packet to be routed through ISA100.11a routers and backbone routers.

Figure 12:
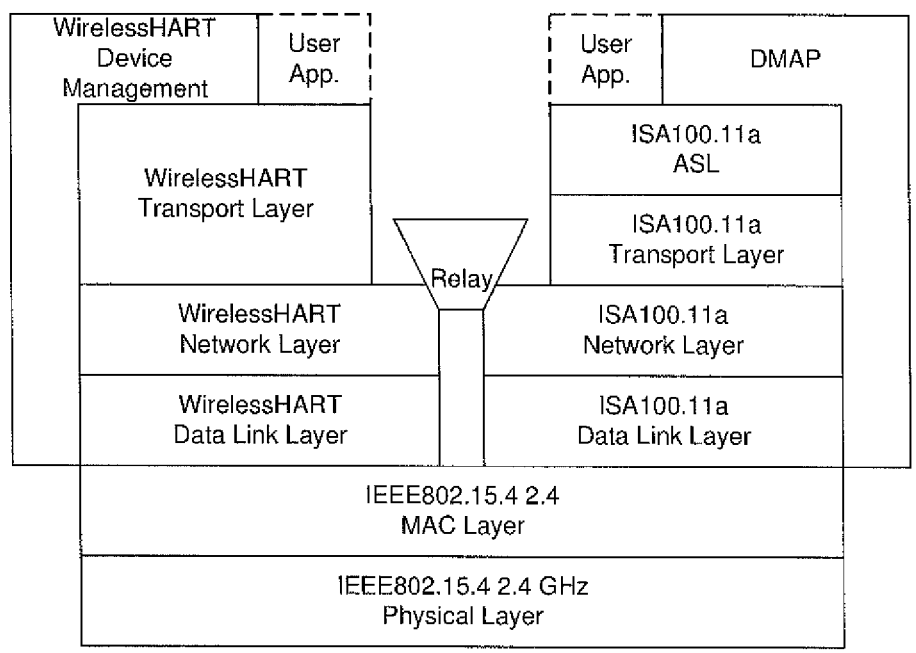
FIG. 12 is a diagrammatic view showing the relay function in the dual-mode router stack.

FIG. 12 shows the relay function in the dual-mode router stack. The WirelessHART® network layer passes packets to be routed to the ISA100.11a network through the relay function. The relay function constructs the information required for the ISA100.11a network layer to form the header. The relay layer also constructs a relay header. The far-end device that receives the relayed packet uses the relay header to reconstruct the WirelessHART® packet header.

Figure 13:
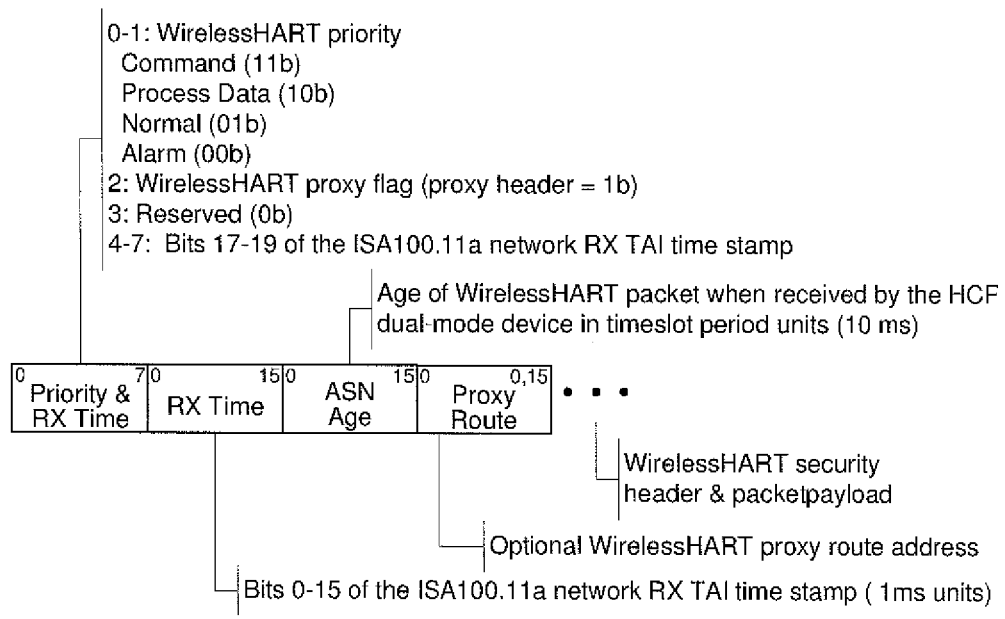
FIG. 13 is a diagrammatic view showing a relay header contains the information required to reconstruct the WirelessHART® header when the packet leaves the ISA100.11a network, in accordance with an embodiment of the present invention.

Dual-mode routers, in accordance with embodiments of the present invention, receiving packets identify the relay header by the UDP destination port number that is configured for the service using the standard ISA100.11a mechanism. The relay header illustrated in FIG. 13 contains the information required to reconstruct the WirelessHART® header when the packet leaves the ISA100.11a network.

The priority field identifies the WirelessHART® priority associated with the packet, and it reflects the priority of the WirelessHART® packet that is being relayed.

The WirelessHART® proxy address bit flag reflects the same value in the received WirelessHART® packet. It is set when there is a WirelessHART® proxy address present in the routing header.

The twenty-bit received time field records when the dual-mode router received the packet. It is based on the ISA100.11a TAI time that is expressed in 1 ms time increments.

The ASN age field records the WirelessHART® packet's network age at the time it was received by the dual-mode router. This is calculated by subtracting the WirelessHART® packet's ASN snippet field from the current ASN time at the dual-mode router.

The WirelessHART® proxy route field is present when the proxy flag is set. The proxy route field contains the address of the WirelessHART® device that proxies the downstream message from the system manager. The relay proxy route field is copied from the WirelessHART® packet's proxy route field.

The dual-mode router processing a received relay header must reconstruct the WirelessHART® header fields. The new ASN snippet field is calculated using the formula:

$$ASN\_snippet = current\_ASN - (ASN\_age + RX\_time/10)$$

The current_ASN is defined as the WirelessHART® time when the relay packet is received by the dual-mode router. The Absolute Slot Number counter measures the time. It is unlikely that the ASN_snippet calculation will generate a negative number. If it does, then the ASN_snippet is set to zero. RX_time is the time spent in the ISA100.11a network. It is calculated from the ISA100.11 TAI time in the DLL header.

The relay priority field is copied into the WirelessHART® priority field. The relay proxy flag is also copied to the WirelessHART® proxy flag, and the proxy route is copied as well, if present.

Figure 14:
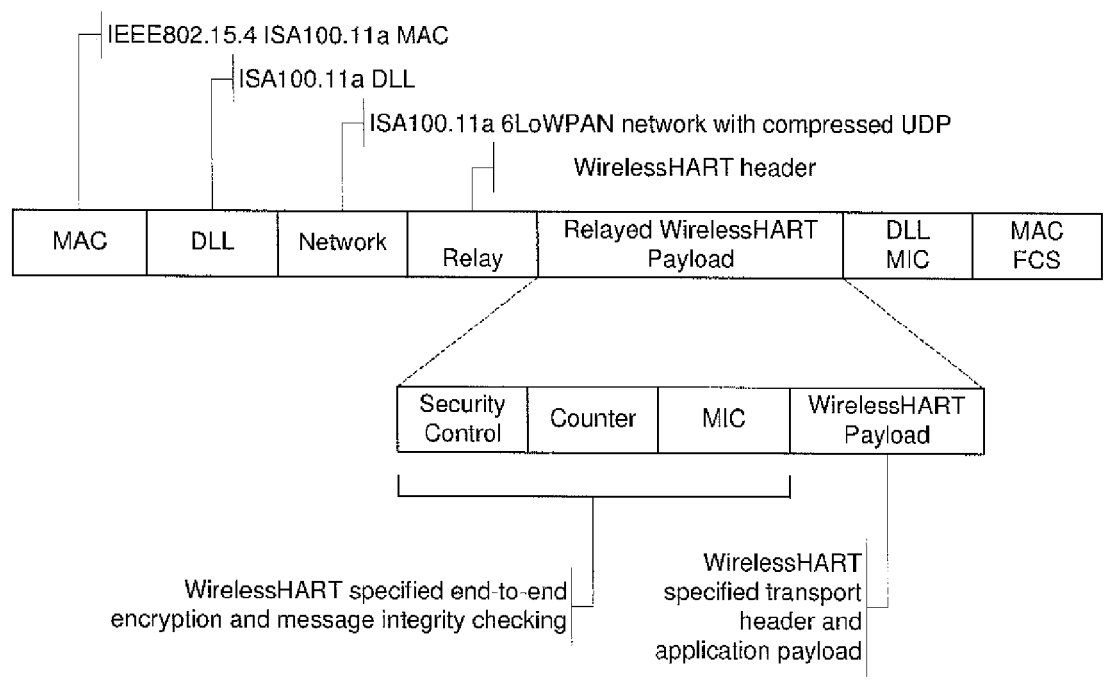
FIG. 14 is a diagrammatic view of a complete relay packet shows the relay header and the relayed portion of the WirelessHART® packet in the ISA100.11a UDP payload, in accordance with an embodiment of the present invention.

FIG. 14 illustrates a complete relay packet and it shows the relay header and the relayed portion of the WirelessHART® packet in the ISA100.11a UDP payload. In one embodiment, the relay packet preserves the WirelessHART® end-to-end security encryption and message integrity checking.

Transport Layer (and Above) Operation

WirelessHART® and ISA100.11a define different transport and application layers. The dual-mode router's relay function encapsulates these portions of the WirelessHART® protocol and transmits them across the ISA100.11a network. ISA100.11a routing functions do not look above the network layer, and so they are insensitive to what WirelessHART® is doing in these upper layers.

System Management

Both WirelessHART® and ISA100.11a support a centralized system management function. WirelessHART® calls this function "network management". This document uses the ISA100 "system manager" term to refer to either the ISA100.11a or the WirelessHART® function. Both system managers perform similar functions that include: a join function for authenticating and setting new devices, configuration functions for providing network connections and security settings, and diagnostic functions for monitoring devices and the network. The details of the operation of each system manager are different. They have different control and reporting messages, different details on how the associated algorithms operate, and different parameters. The WirelessHART® system manager's message structure is based on a catalogue of control/response messages that can be concatenated in packet payloads. The ISA100.11a system manager is based on application layer processes, objects, and attributes that are combined together to form packet payloads.

For the WirelessHART® and ISA100.11a networks to be compatible, the WirelessHART® and ISA100.11a system managers have to coordinate a number of things that include network resource configuration assignments and diagnostics. This can be done by either designing one system manager that manages both networks in their native management language, or designing separate managers with an API that supports coordinated management between them.

The coordinated system management function assigns the short (16 bit) addresses to all the ISA100.11a and WirelessHART® devices. In this embodiment separate address ranges are setup for ISA100.11a and WirelessHART® devices and the address ranges are configured in the dual-mode routers. The ranges selected need to accommodate the address restrictions imposed by the different standards.

In another embodiment the distinct networks are assigned different PAN identifiers that are used by the dual-mode routers to designate the origin of the received packet.

Both WirelessHART® and ISA100.11a have similar joining processes, but ISA100.11a differs in its details. Each device uses its native joining protocol. The WirelessHART® join messages are relayed over the ISA100.11a network by the dual-mode router in accordance with an embodiment of the present invention. The dual-mode router needs to join each system manager function so that each protocol stack can be configured and controlled.

Network diagnostics include periodic health reports and aperiodic event reports. The two standards do not have identical parameters or report formats. Each device reports to its native system management function. The dual-mode router reports to both system management functions. Parts of the reports generated by devices are parameters that measure bad MAC frame check sequences and bad DLL message integrity checks. However, in a mixed network, the bad message integrity check count is not indicative of interference because WirelessHART® and ISA100.11a use different message integrity check keys to prevent devices from interpreting each other's packets. The frame check sequence is the true measure of the interference level.

In both standards, the system manager configures the network stack and local device network manager through over-the-air messages. Each device is controlled by its native configuration messages. Each of the dual-mode router's stacks is controlled by the native stack control messages. Since the dual-mode router shares the physical layer and MAC layer between the two upper layer stacks, the WirelessHART® and ISA100.11a system management functions coordinate the configuration of these layers. The network assignments that are coordinated across the two networks include: 16 bit addresses, graph IDs, source routes, network IDs, superframes, channel hop sequences, and timeslot assignments.

Security Operation

Both WirelessHART® and ISA100.11a have a DLL security function and an upper layer end-to-end security function. The ISA100.11a standard has several options for DLL security that are based on the IEE802.15.4 options allowed for the MAC. The dual-mode router requires that ISA100.11a select an option that causes the message integrity checking to turn on. It is also desirable to make the message integrity check field four octets long to simplify the operation of the dual-mode router.

WirelessHART® places the end-to-end security encryption and message integrity checking functions in the network layer. For ISA100.11a they are in the transport layer. This is not important to the relay function, which is involved only with routing the packet and not the destination device processing of the WirelessHART® protocol. The relay function does not decrypt or check the integrity of the encrypted WirelessHART® packet payload. The encrypted WirelessHART® network layer payload and associated WirelessHART® message integrity check field are sent across the ISA100.11a network unchanged by the relay function.

When a dual-mode router receives a relayed packet, it reconstructs the WirelessHART® network layer and inserts the end-to-end encrypted packet along with its message integrity check into the payload.

Preferably the two networks do not share any keys and key management can be combined or kept separate.

Gateway Operation

Both WirelessHART® and ISA100.11a define similar gateway functions. However, the gateways use different application layer protocols to communicate with the field devices. As discussed above, WirelessHART® uses a command/response protocol and ISA100.11a uses a protocol based on the port, object, and attribute identifiers. ISA100.11a allows multiple gateway devices to be addressed in the network, whereas WirelessHART® has one gateway function and multiple access points that connect to the network. WirelessHART® does not preclude a vendor from building a redundant distributed gateway. It only specifies that the gateway has a well-known address and that it looks like one device to the WirelessHART® field devices.

Each device in the combined network talks to its native gateway. If the dual-mode router supports a process/control application, then it is configured to talk to either the WirelessHART® gateway or an ISA100.11a gateway. All gateway application level communications are transparent to the relay function.

The ISA100.11a and WirelessHART® gateways communicate with process and control applications on the plant network through a high-side interface. In FIGS. 1 and 2, the high-side interface is on the right side of the gate device boxes.

The WirelessHART® system is designed to enable the HART7 device applications to communicate with the WirelessHART® Gateway. This gateway may directly connect to the WirelessHART® network or connect by access points through an intermediary network technology. The access points of the WirelessHART® system are similar to the backbone routers in the ISA100.11a network. In a combined system, the WirelessHART® gateway can connect in a variety of ways.

1. The gateway may only have a WirelessHART® stack and therefore it needs to talk to one or more dual-mode routers. In this case, the WirelessHART® gateway operates without any modifications, and the dual-mode routers make the ISA100.11a network transparent to it. The network with an unmodified WirelessHART® gateway is shown in FIG. 1.

2. The gateway may incorporate a dual-mode router. In this case, the gateway sits directly on the ISA100.11a network, and its relay function connects the upper WirelessHART® protocol stack layers to the ISA100.11a network layer.

3. The gateway may be a device that is on a backbone network served by one or more ISA100.11a backbone routers. This gateway has a lower protocol stack defined by a backbone network. The backbone protocol stack is integrated with the relay function layer. The relay function reconstructs the WirelessHART® header data needed by the gateway's WirelessHART® upper protocol layers. This WirelessHART® gateway is shown in the network in FIG. 2.

4. The gateway may be a device that is on a backbone network served by one or more WirelessHART® access points. In this case, the WirelessHART® access points are dual-mode routers that transport relay packets on the ISA100.11a network and WirelessHART® messages on the backbone network. The dual-mode, WirelessHART® access points make the ISA100.11a network transparent to the WirelessHART® Gateway.

5. The WirelessHART® and ISA100.11a gateways are integrated into one device with the dual protocol stacks.

Dual-Mode Router

The dual-mode router is preferably both a WirelessHART® device and an ISA100.11a device. It provides a connection between the networks through its relay function. Dual-mode routers preferably appear as normal routing-capable devices to both the WirelessHART® and ISA100.11a networks. A combined WirelessHART® and ISA100.11a network requires at least one dual-mode router in accordance with an embodiment of the present invention. Large networks and/or robust networks require more then one dual-mode router.

Dual-mode routers preferably participate in the mesh network. A graph route that spans a portion of the WirelessHART® and ISA100.11a networks may incorporate more than one dual-mode router as an entry point to the ISA100.11a. Because large WirelessHART® packets are fragmented when they enter the ISA100.11a network and defragmented when they leave, there can only be one dual-mode router on the graph's exit from the ISA100.11a network.

The dual-mode router preferably has a single radio, which it uses to transmit and receive packets from WirelessHART® and ISA100.11a networks. As a result, the router must distinguish between WirelessHART® formatted packets and ISA100.11a formatted packets. There are various methods for distinguishing packets. In one method, the dual-mode router is provided with a range of 16 bit addresses used for each protocol. It uses the range to determine if a given wireless data packet is WirelessHART® or ISA100.11a based on the MAC source address field. This works because the coordinated system management function assigns addresses to ISA100.11a and WirelessHART®. The address range may be used for links that are shared or dedicated. In another method, the WirelessHART® and ISA100.11a networks are assigned different PAN identifiers. The dual-mode router then looks at the PAN ID field in the IEEE802.15.4 MAC header to tell which type of packet has been received.

The dual-mode router is preferably assigned separate 16 bit addresses or PAN identifiers and 64 bit EUIs for its WirelessHART® and ISA100.11a protocol stacks. It uses the WirelessHART® 16 bit address for the MAC source address when transmitting WirelessHART® packets and the ISA100.11a 16 bit address for the MAC source address when transmitting ISA100.11a packets. Messages that are sent using the 64 bit EUI as the MAC source address are identified by the organization block number that has been assigned to the HART® Foundation for all WirelessHART® devices.

The dual-mode router preferably participates in the network formation of both the WirelessHART® and ISA100.11a networks. It must advertise and be a clock parent in the WirelessHART® network. It also does neighbor discovery for both networks.

Advertisement packets are sent out to give joining devices enough information to send join request and receive join responses. The details of the format and algorithms for each standard are different, and there is no need to coordinate them. Each standard's devices generate their advertisement messages, which are differentiated by the different well-known MIC keys used. In accordance with an embodiment of the present invention, the dual-mode router is configured to advertise for both networks, transmitting different advertisements for each.

WirelessHART® uses DLL Keep-Alive packets to discover neighbors and maintain contact with them. The WirelessHART® device looks for packets sent from unknown devices and Keep-Alive messages to maintain the neighbor table. In a mixed network, the DLL MIC that uses the WirelessHART® key excludes ISA packets.

ISA100.11a has a similar neighbor discovery process. ISA100.11a devices also use the DLL MIC key to exclude WirelessHART® devices from being recognized as neighbors.

A dual-mode router, in accordance with an embodiment of the present invention, keeps separate WirelessHART® and ISA100.11a neighbor tables. Packets received on links used exclusively for either standard, are checked with the DLL MIC key assigned to the standard. If a link is shared by the standards, the dual-mode router can either check both keys or alternate which key it picks. While trying both keys is preferable, it places a time constraint on the hardware and software that may not be possible for all devices to meet. Alternating keys for shared channels does not prevent the discovery of new neighbors; it only slows the process down.

The dual-mode router may be the device that initiates a WirelessHART® network in a region. When a device initiates a network, it needs to supply the timeslot clock to its children and to establish the ASN. The dual-mode router preferably derives its ASN clock from the ISA100.11a TAI clock. The coordinated system management function establishes a clock tree from the ISA100.11a clock source, down through the ISA100.11a network, out through the dual-mode router and into the WirelessHART® network. The dual-mode router uses the ISA100.11a's clock child process to get the TAI clock from its ISA100.11a parents. It then converts TAI time to ASN time and propagates it to the WirelessHART® children.

The dual-mode router sets the ASN to 0 either when it joins the system manager through the ISA100.11a network, or it adopts the ASN it gets from the advertisements it hears from other WirelessHART® devices.

The WirelessHART® and ISA100.11a system management functions cooperate in the control and monitoring of the dual-mode router. The cooperative system management function can be implemented by designing a combined system management function or by designing a API between an ISA100.11a system manager and a WirelessHART® system manager.

Each standard's system manager function configures and monitors its portion of the device's protocol stack. One of the two management functions controls the shared physical, MAC, and relay functions. Coordination of separately managed and shared portions of the dual-mode router protocol stack is done between the two system management functions. Both system managers are sent periodic and event reports by the dual-mode routers. Reports regarding the operation of a specific network are sent to the associated system manager. Reports regarding the device can be sent to both system managers, although in general one manager will be responsible for managing the overall device.

Figure 15:
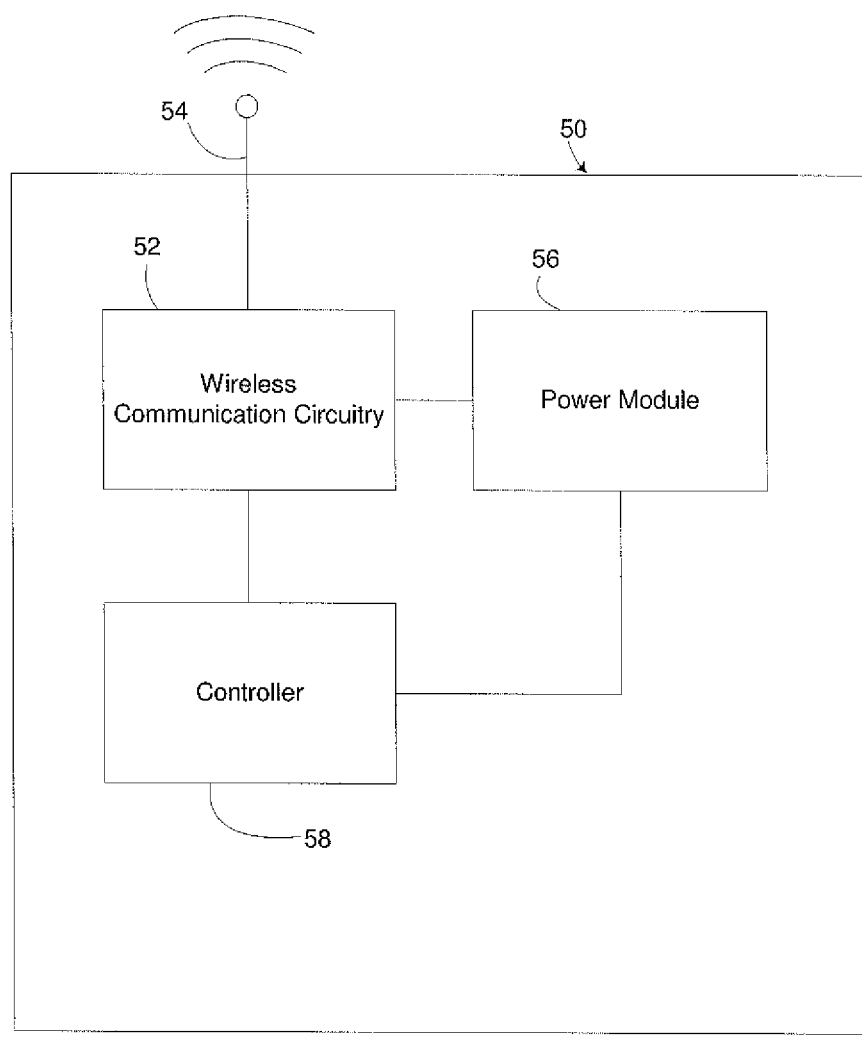
FIG. 15 is a diagrammatic view of a dual-mode router in accordance with an embodiment of the present invention.

FIG. 15 is a diagrammatic view of a dual-mode router in accordance with an embodiment of the present invention. Router 50 includes wireless communication circuitry 52 coupled to antenna 54, which may be an internal or external antenna. Wireless communication circuitry 52 preferably includes radio-frequency communication circuitry in accordance with IEEE802.15.4 operating at 2.4 GHz.

Router 50 also includes power module 56 coupled to wireless communication circuitry 52 and controller 58. Power module 56 is configured to provide suitable operating power to wireless communication circuitry 52 and controller 58. Power module 56 can be an internal power source, such as a battery or super-capacitor, or may be configured to receive and/or condition power from an external source. Examples of external sources include, but are not limited to, photovoltaic cells, wind generators, thermal generators, vibration-based generators, a process communication loop (such as a wired HART® or FOUNDATION™ Fieldbus loop/segment), or even 110 VAC.

Controller 58 is preferably a microprocessor configured, through hardware, software or a combination thereof, to provide the various functions set forth above in accordance with embodiments of the present invention.

In embodiments where router 50 will be mounted in the "field" it is useful for such embodiments to employ an explosion-proof housing and/or intrinsically safe circuitry. One example of Intrinsic Safety requirements is set forth in: APPROVAL STANDARD INTRINSICALLY SAFE APPARATUS AND ASSOCIATED APPARATUS FOR USE IN CLASS I, II and III, DIVISION NUMBER 1 HAZARDOUS (CLASSIFIED) LOCATIONS, CLASS NUMBER 3610, promulgated by Factory Mutual Research October, 1998.

While embodiments of the present invention have generally provided a detailed and exacting example of specific configuration parameters and devices to enable interoperability between ISA100.11a and WirelessHART®, those skilled in the art will recognize that variations can be used as long as interoperability is maintained. Further, while embodiments disclosed herein generally provide complete interoperability, embodiments of the present invention also include partial interoperability, such as simply coordinating the time base of the two distinct networks such that collision avoidance can be enhanced, even if packets cannot traverse distinct networks. Further still, while embodiments of the present invention have generally been described with respect to a dual-mode router, embodiments can be practiced in any device that includes a suitable radio and a controller that can be configured in accordance with the various embodiments described above. Thus, embodiments of the present invention can be practiced in a WirelessHART® Backbone gateway, an ISA100.11a backbone gateway, an ISA100.11a routing device, or any suitable device.

Embodiments of the present invention are believed to provide a number of potential advantages. The technologies and parameter settings used to achieve compatibility between WirelessHART® and ISA100.11a in accordance with embodiments of the present invention do not significantly affect the efficiency of the ISA100.11a protocol, and they promote the efficient use of shared network resources such as channels and timeslots. Further, by making a mode of ISA100.11a compatible with WirelessHART®, the two networks are integrated providing the users with the appearance of one network, one integrated management function, and ability to purchase either a WirelessHART® or ISA100.11a device that works on an integrated network infrastructure. An integrated WirelessHART® and ISA100.11a network increases the network resources available to devices and reduces the interference, which separate systems experience when transmissions collide. Backwards compatibility is provided since no changes are made to the published HART7 standard. The transport of WirelessHART® packets across the ISA100.11a network is transparent to WirelessHART® devices and applications. ISA100.11a compatibility is ensured since regular ISA100.11a devices route the WirelessHART® packets relayed by the dual-mode routers across the ISA100.11a network. The relay function, in accordance with embodiments of the present invention, works with the ISA100.11a network layer and the network configurations documented in the ISA100.11a standard. Finally, the relay function does not impose significant burdens on the dual-mode router's hardware or processor.

Although the present invention has been described with reference to particular embodiments, workers skilled in the art will recognize that changes may be made in form and detail without departing from the spirit and scope of the invention.

What is claimed is:

1. A process communication system comprising:
   an International Society of Automation (ISA) 100.11a wireless process communication network;
   a first system manager which at least one of configures, controls and monitors the ISA 100.11a wireless process communication network;
   a WirelessHART® process communication network;
   a second system manager which at least one of configures, controls and monitors the WirelessHART® process communication network; and
   wherein the first and second system managers are configured to communicate with each other to coordinate operation of the process communication system.

2. The system of claim 1, wherein the first and second system managers provide collision avoidance between the first and second distinct wireless process communication networks.

3. The system of claim 1, wherein the first and second system managers coordinate 16 bit address assignment of field devices so that addresses in the IEEE802.15.4 MAC header may be used to identify a packet on one of a plurality of distinct wireless process control networks.

4. The system of claim 1, wherein the first and second system managers coordinate the selection of a plurality of unique Personal Area Network (PAN) identifiers for each distinct wireless process control network such that the PAN identifier(s) in the IEEE802.15.4 MAC header can be used to identify the distinct wireless process control network.

5. The system of claim 1, wherein the first and second system managers coordinate graph IDs across each of the first and second distinct wireless process communication networks.

6. The system of claim 1, including:
a plurality of distinct wireless process communication networks including the ISA 100.11a wireless process communication network and the WirelessHART® process communication network;
a plurality of devices with dual-mode router functionality;
at least one field device configured to communicate on at least one of the distinct wireless process communication networks; and
a coordinated system manager adapted to provide at least one function of configuring, controlling, and monitoring of the plurality of distinct wireless process communication networks.

7. The system of claim 6, wherein the system supports communication from the field device on a first distinct wireless process communication network communicating through a second distinct wireless process communication network to a host application of the field device's process control system.

8. The system of claim 6, wherein the system supports communication from the field device on a first distinct wireless process communication network communicating through a second distinct wireless process communication network to a field device also on the first distinct wireless process communication network.

9. A dual-mode communication device for conveying process communication packets across a plurality of distinct wireless process communication networks comprising the ISA 100.11a wireless communication process network and the WirelessHART® process communication network of claim 1, the device comprising:
wireless radio frequency communication circuitry configured to interact with signals from each of the plurality of distinct wireless process communication networks;
a controller coupled to the wireless radio frequency communication circuitry, the controller being configured to receive wireless process communication packets for each of the plurality of distinct wireless process communication networks.

10. The dual-mode communication device of claim 9, wherein the controller is configured to generate wireless process communication packets for each of the plurality of distinct wireless process communication networks.

11. The dual-mode communication device of claim 9, wherein the device is operably coupled to a plant network.

12. The dual-mode communication device of claim 9, wherein the device is a dual-mode access point.

13. The dual-mode communication device of claim 9, wherein the device is embodied within a wireless gateway device.

14. A dual-mode router for conveying process communication packets across a plurality of distinct wireless process communication networks, the router comprising:
wireless radio frequency communication circuitry configured to interact with signals from a WirelessHART® network and an ISA 100.11a network;
a controller coupled to the wireless radio frequency communication circuitry, the controller being configured to adapt process communication packets from the ISA 100.11a wireless process communication network for transmission over the WirelessHART® network.

15. The dual-mode router of claim 14 wherein adapting the communication packets includes removing a WirelessHART® packet payload from an ISA 100.11a packet and placing the WirelessHART® packet payload in a WirelessHart® packet.

16. The dual-mode router of claim 14 wherein adapting the communication packets includes translating ISA 100.11a header information into WirelessHart® headers.

17. The dual-mode router of claim 14 wherein the controller is further configured to coordinate system management for ISA 100.11a network and the WirelessHart® network.

18. The system of claim 1 wherein devices on the ISA 100.11a wireless process communication network and devices communicating on the WirelessHart® process communication network have different address ranges.

19. The system of claim 6 wherein the coordinated system manager is further adapted to provide diagnostics in accordance with the ISA 100.11a and WirelessHart® communication standards.

* * * * *